(12) United States Patent
Tung et al.

(10) Patent No.: US 7,443,073 B2
(45) Date of Patent: Oct. 28, 2008

(54) ELECTRIC FAN

(75) Inventors: Chao-Nien Tung, Tu-Cheng (TW);
Chih-Hao Yang, Tu-Cheng (TW);
Chuen-Shu Hou, Tu-Cheng (TW)

(73) Assignee: Foxconn Technology Co., Ltd., Tu-Cheng, Taipei Hsien (TW)

( * ) Notice: Subject to any disclaimer, the term of this patent is extended or adjusted under 35 U.S.C. 154(b) by 348 days.

(21) Appl. No.: 11/309,068

(22) Filed: Jun. 15, 2006

(65) Prior Publication Data

US 2007/0075598 A1     Apr. 5, 2007

(30) Foreign Application Priority Data

Sep. 23, 2005   (CN) .................. 2005 1 0037475

(51) Int. Cl.
*H02K 7/00* (2006.01)
*H02K 1/12* (2006.01)
*F03G 7/00* (2006.01)

(52) U.S. Cl. .................. 310/254; 310/62; 310/67 R; 310/91; 310/156.26

(58) Field of Classification Search .................. 310/58, 310/62, 63, 67 R, 91, 156, 26, 254
See application file for complete search history.

(56) References Cited

U.S. PATENT DOCUMENTS 4,987,331 A    1/1991  Hrong

| 6,672,839 B2 | 1/2004 | Schloetzer | |
|---|---|---|---|
| 2005/0067917 A1 | 3/2005 | Kastinger et al. | |
| 2006/0279157 A1* | 12/2006 | Tung et al. | 310/216 |
| 2007/0013242 A1* | 1/2007 | Tung et al. | 310/67 R |
| 2007/0075598 A1* | 4/2007 | Tung et al. | 310/67 R |
| 2007/0080604 A1* | 4/2007 | Yang et al. | 310/257 |

FOREIGN PATENT DOCUMENTS

CN   99248063.9    8/2000

* cited by examiner

*Primary Examiner*—James Harvey

(57) ABSTRACT

An electric fan includes a frame (10) having a central tube (12) extending therefrom, a bearing (30) received in the central tube, a stator (50) mounted around the central tube, and a rotor (70) being rotatably supported by the bearing. The frame defines an air inlet (19) and an air outlet (17) at two different sides thereof. The stator includes a stator core (52) having a central cylinder (520). A plurality of radial posts (522) extends from the central cylinder. A plurality of magnetic poles (524) is formed at free ends of the posts. A plurality of stator coils (54) is wound around the posts. Each magnetic pole includes a lower portion (700) adjacent to the air outlet and an upper portion (60) adjacent to the air inlet. The upper portions expand radially along a direction from the air inlet to the air outlet.

14 Claims, 5 Drawing Sheets

ELECTRIC FAN

FIELD OF THE INVENTION

The present invention relates to an electric fan, and more particularly to a motor for an electric fan.

DESCRIPTION OF RELATED ART

With the continuing development of electronic technology, electronic packages such as CPUs (central processing units) are generating more and more heat that requires immediate dissipation. Electric cooling fans are commonly used in combination with heat sinks for cooling CPUs.

Referring to FIG. 5, a conventional electric cooling fan includes a stator 6, a rotor 8 rotatable with respect to the stator 6, and a fan housing 2 receiving the rotor 8 and stator 6 therein. The stator 6 is approximately cylinder-shaped and typically includes a stator core 62 and stator coils 64 wound around the stator core 62. The stator core 62 consists of layered yokes. Each yoke includes a ring shaped center portion and a plurality of pole members extending outwardly from the center portion for winding the coils thereon. To avoid the coils 64 electrically contacting with the stator core 62, upper and lower insulating frames 66, 68 cover the stator core 62 and electrically insulate the stator coils 64 from the stator core 62. The rotor 8 includes a hub 82 surrounding the stator 6. The hub 82 includes a flat, disc-shaped top wall 81 and a cylinder-shaped sidewall 83 extending downwardly from an outer-periphery of the top wall 81. A plurality of fan blades 86 extend outwardly from the sidewall 83, and a cylinder-shaped permanent magnet 84 is attached to an inner surface of the sidewall 83 of the hub 82. A shaft 88 extends downwardly from a central portion of the top wall 81 into a bearing 4 mounted in the fan housing 2. During operation of the fan, an alternating magnetic field established by the stator 6 interacts with a magnetic field of the permanent magnet 84 to drive the rotor 8 to rotate, thereby generating an airflow via the fan blades 86.

One way to enhance the amount of airflow generated by the fan is to increase the size of the blades 86. However, this way will increase the size of the cooling fan, which is disadvantageous in view of the degree of miniaturization required in electronic products. Another way is to reduce the diameter of the hub 82. However, the yokes of the stator core 62 are formed by stamping silicon-steel sheets, each of which has a flat configuration and a predetermined diameter; thus, the size and the shape of the stator core 62 are pretty much fixed and difficult to alter. Due to the fixed size and shape of the stator 6, the shape and size of the rotor 8 including the hub 82 are also difficult to alter. For the conventionally-shaped hub 82, a turbulent flow is produced in the area of an air inlet of the conventional electric fan, which significantly affects the pressure and the speed of the airflow. Furthermore, the flat, disc-shaped top wall 81 of the hub 82 forms a barrier for the airflow through the fan, thus adversely affecting the flow rate of the airflow. Accordingly, the airflow provided by the conventional electric fan cannot efficiently dissipate heat absorbed by a heat sink from a heat-generating electronic component away from the heat sink.

What is needed, therefore, is an electric fan generating a relatively larger amount of airflow and a relatively smaller size.

SUMMARY OF THE INVENTION

According to a preferred embodiment of the present invention, an electric fan includes a frame having a central tube extending therefrom, a bearing received in the central tube, a stator mounted around the central tube, and a rotor being rotatably supported by the bearing. The frame defines an air inlet and an air outlet at two different sides thereof. The stator includes a stator core having a central cylinder. A plurality of radial posts extend from the central cylinder. A plurality of magnetic poles are formed at free ends of the posts. Each magnetic pole includes a lower portion adjacent to the air outlet and an upper portion adjacent to the air inlet; the upper portions expand radially along a direction from the air inlet to the air outlet. The rotor includes a hub and a plurality of blades extending from an outer-periphery of the hub. An upper portion of the hub expands radially along the flow direction. Thus the outer surface of the hub has a streamlined shape with the outer surface with the smallest diameter facing the air inlet of the fan; the flow resistance of the airflow is reduced and the air-flow turbulence and noise are avoided. The fan blades of the rotor have a larger size and thus can generate a larger amount of airflow. As a result a greater amount of airflow with increased speed and pressure is generated, and the heat dissipation efficiency of the electric fan is improved.

Other advantages and novel features of the present invention will be drawn from the following detailed description of a preferred embodiment of the present invention with attached drawings, in which:

BRIEF DESCRIPTION OF THE DRAWINGS

Many aspects of the present electric fan can be better understood with reference to the following drawings. The components in the drawings are not necessarily drawn to scale, the emphasis instead being placed upon clearly illustrating the principles of the present electric fan. Moreover, in the drawings like reference numerals designate corresponding parts throughout the several views.

DETAILED DESCRIPTION OF THE INVENTION

Figure 1:
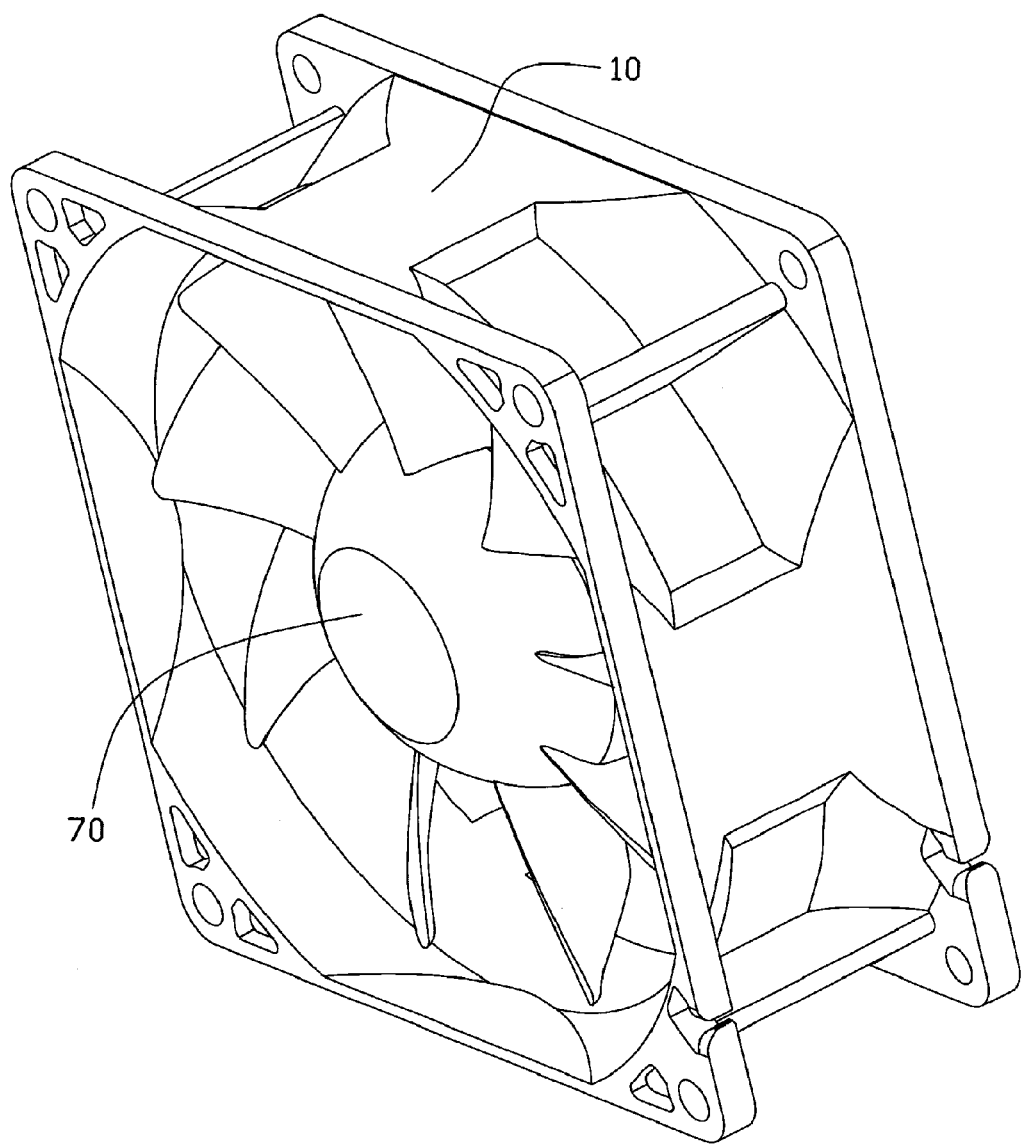
FIG. 1 is an isometric, assembled view of an electric fan in accordance with a preferred embodiment of the present invention.
Figure 2:
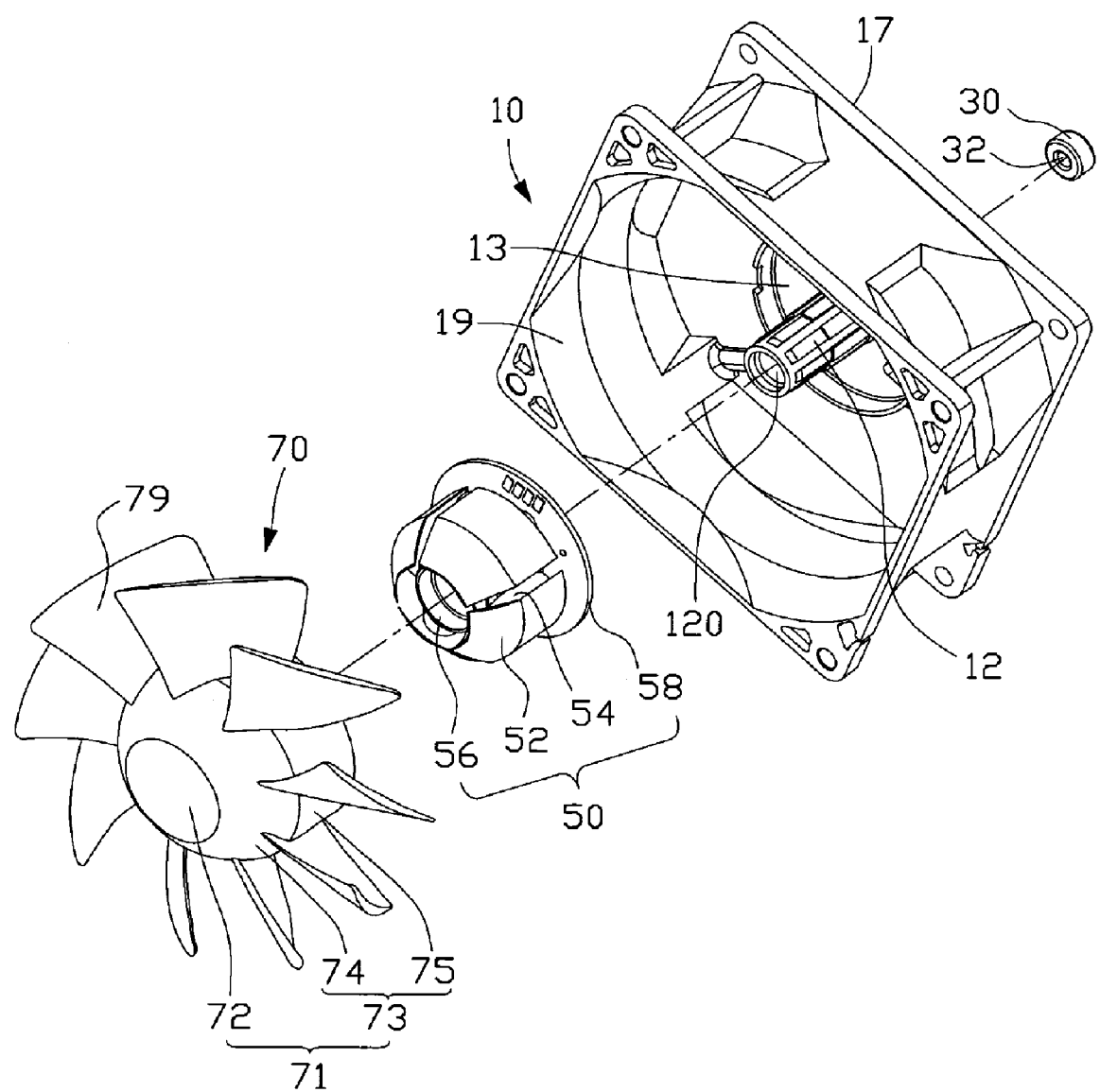
FIG. 2 is an explored view of the electric fan of FIG. 1.

Referring to FIGS. 1 through 2, an electric fan according to a first embodiment of the present invention includes a rotor 70, a stator 50 relative to which the rotor 70 is rotatable, a frame 10 receiving the rotor 70 and the stator 50 therein, and a bearing 30 mounted in the frame 10 for supporting the rotor 70 in rotation.

Figure 3:
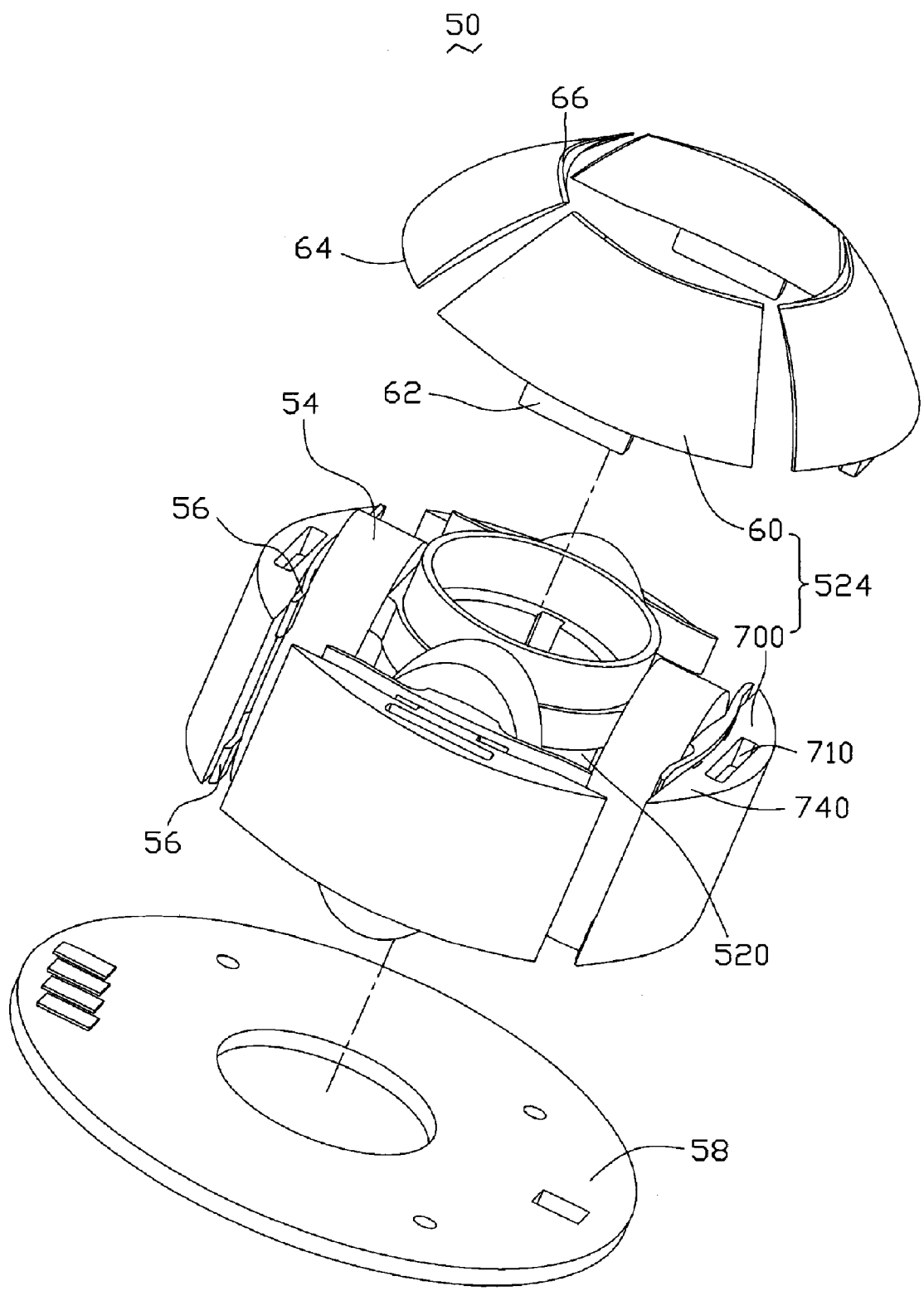
FIG. 3 is an isometric, explored view of a stator of the electric fan of FIG. 1.
Figure 4:
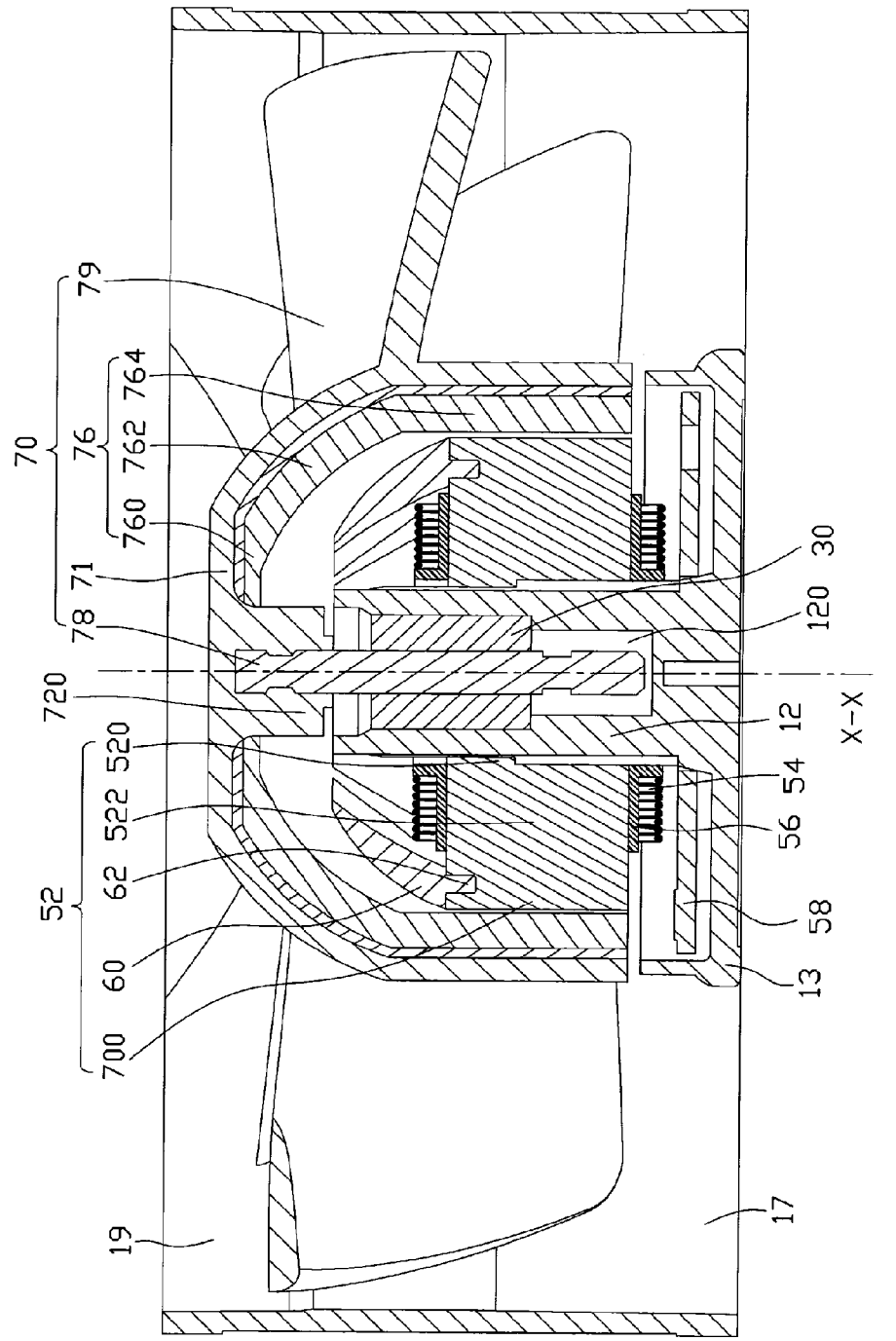
FIG. 4 is a cross-sectional view of the electric fan of FIG. 1.

Referring to FIGS. 3 through 4, the frame 10 is square shaped. An air inlet 19 and air outlet 17 are defined at two opposite sides of the frame 10, respectively. An airflow generated by the fan flows from the air inlet 19 to the air outlet 17. The frame 10 includes a base 13 adjacent to the air outlet 17. A central tube 12 extends upwardly from a central portion of the base 13. The central tube 12 defines a central hole 120 receiving the bearing 30 therein. An axial hole 32 is defined in the bearing 30.

The stator 50 is mounted around the central tube 12. The stator 50 includes a stator core 52, radial stator coils 54 wound around the stator core 52, and a PCB 58 (printed circuit board) being electrically connected with the coils 54. To avoid the coils 54 electrically contacting with the stator core 52, an insulating frame 56 is arranged between the stator core 52 and the coils 54, and electrically insulates the stator coils 54 from the stator core 52. The stator core 52 includes a central cylinder 520 defining a central axis X-X therein, a plurality of radial posts 522 and a plurality of magnetic poles 524. The stator core 52 is slotted to define these radial posts 522. The posts 522, evenly spaced from each other, extend radially outwardly from an outer-periphery of the central cylinder 520. The stator coils 54 are respectively wound on these posts 522 of the stator core 52.

The magnetic poles 524 are formed at each free end of the posts 522. Each magnetic pole 524 includes an upper portion 60 adjacent to the air inlet 19 and a lower portion 700 adjacent to the air outlet 17. Each lower portion 700 of the magnetic poles 524 connects with the free end of a corresponding post 522. The upper portions 60 are mounted on the lower portions 700 when the stator 50 is assembled. Each upper portion 60 has a top surface 66 facing the rotor 70 and a bottom surface 64 contacting with a corresponding lower portion 700. A tenon 62 extends downwardly from each bottom surface 64 of the upper portions 60. Each lower portion 700 includes a contacting surface 740 defining a mortise 710 receiving a corresponding tenon 62 therein. Alternatively, the tenon 62 can be formed on the contacting surface 740 of the lower portion 700, whilst the bottom surface 64 of the upper portion 60 defines the mortise 710 therein. Also the upper portions 60 can be integrally formed with the lower portions 700 of the magnetic poles 524. The upper portions 60 of the magnet poles 524 are formed by powder sintering separately. The lower portions 700 are formed by powder sintering integrally with the central cylinder 520 and the radial posts 522.

The lower portions 700 of the magnetic poles 524 are symmetric to and parallel to the axis X-X. In other words, the distance between each lower portion 700 and the axis X-X is constant along the axial direction thereof. Cooperatively the lower portions 700 create a cylinder-shaped profile. Each upper portion 60 extends upwardly and aslant from the lower portions 700. The upper portions 60 gradually slant towards the axis X-X along their extending directions. As viewed along the flowing direction of the airflow, the upper portions 60 expand radially, and the distance between the upper portions 60 of the magnetic poles 524 and the axis X-X gradually increases. The top surfaces 66 of the upper portions 60 define the smallest outer diameter, whilst the bottom surfaces 64 of the upper portions 60 define the largest outer diameter of the upper portions 60. The largest outer diameter of the upper portions 60 is approximately the same as the outer diameter of the lower portions 700. Therefore the upper portions 60 of the magnetic poles 524 cooperatively have a profile similar to a truncated paraboloid, which has a diameter gradually increasing along the flowing direction of the airflow. Alternatively, the upper portions 60 of the magnetic poles 524 can be other shapes, such as truncated cone. Also the lower portions 700 of the magnetic poles 524 can be truncated paraboloid in profile.

Figure 5:
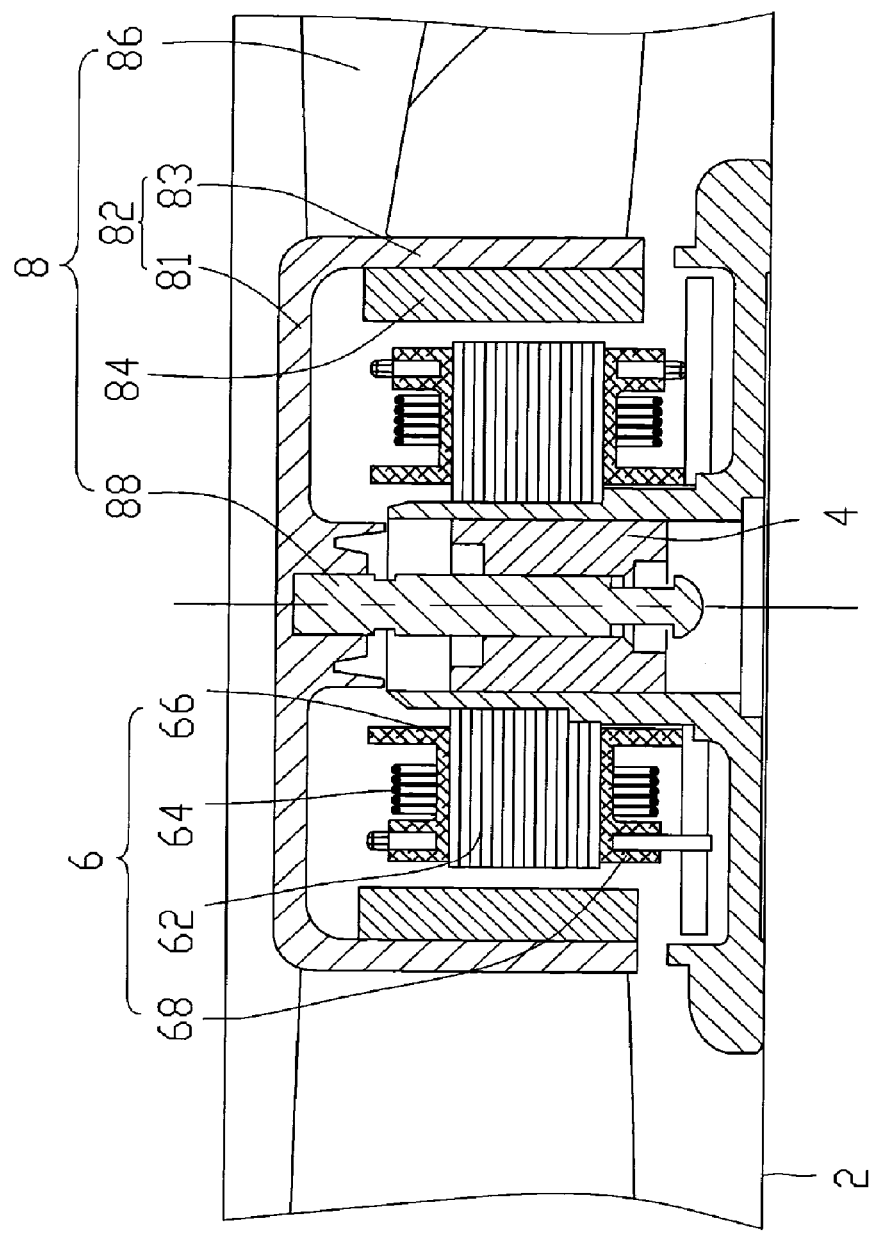
FIG. 5 is a cross-sectional view of a conventional electric fan.

The rotor 70 covers the stator 50 therein and has a profile generally conforming to the profile of the stator core 52. The rotor 70 includes a hub 71 having a planar shaped topwall 72 forming a shaft seat 720 at a central portion, a sidewall 73 extending downwardly and outwardly from an outer-periphery of the topwall 72, a shaft 78 received in the shaft seat 720 and extending downwardly therefrom to be rotatably received in the bearing 30, a plurality of fan blades 79 extending radially from the sidewall 73 of the hub 71, and a permanent magnet 76 adhered to an inner wall of the sidewall 73 of the hub 71 to establish a magnetic field. The sidewall 73 of the hub 71 includes an upper portion 74 facing the upper portions 60 of the magnetic poles 524, and a lower portion 75 facing the lower portions 700 of the magnetic poles 524. Matching the shape of the hub 71, the permanent magnet 76 has a top wall 760 with a shape of a flat ring, facing the top surfaces 66 of the upper portions 60 of the magnetic poles 524, and a sidewall having upper and lower portions 762, 764 facing the upper and lower portions 60, 700 of the magnetic poles 524. The outer diameter of the upper portion 74 of the sidewall 73 of the hub 71 (also the upper portion 762 of the sidewall of the permanent magnet 76) gradually increases along the flowing direction of the airflow. In other words, an outer surface of the upper portion 74 of the sidewall 73 of the hub 71 has a streamlined shape. Thus, the turbulent flow occurring at the inlet of the conventional electric fan can be avoided in the present invention and the flow resistance of the airflow is reduced. The hub 71 occupies a space which is smaller than that of the hub 82 of the conventional electric fan of FIG. 5 when the hub 82 has a diameter the same as that of the hub 71 measured at a bottom end thereof. Thus the blades 79 of the rotor 70 can have a relatively larger size than that of the blades 86 of the conventional electric fan of FIG. 5 when the electric fan in accordance with the present invention has the same size as the conventional fan. Accordingly, the amount of airflow generated by the fan blades 79 is greatly increased.

When the electric fan is assembled together, the tenons 62 of the upper portions 60 of the magnetic poles 524 are received in the mortises 710 of the lower portions 700 of the magnetic poles 524. The stator coils 54 are wounds on each post 522. Thus the stator 50 is assembled. The shaft 78 of the rotor 70 extends through the axial hole 32 of the bearing 30 into the central hole 120 of the tube 12. During operation, the radial stator coils 54 establish an alternating magnetic field which interacts with the magnetic field of the permanent magnet 76 of the rotor 70, thus driving the rotor 70 to rotate. Due to the larger size of the fan blades 79, a relatively large amount of airflow is generated by the electric fan of the present invention. As the airflow flows through the electric fan to the heat-generating component, the flowing resistance is lowered due to the streamlined shape of the outer surface of the hub 71. Also turbulent flow and the resulting noise are generally avoided. The speed and pressure of the airflow are increased. After leaving the air outlet 17, the larger amount of airflow with increased speed and pressure blows onto the heat-generating component and takes away the heat of the heat source effectively. Thus, the flow rate of the airflow and the heat dissipating effectiveness of the electric fan are improved.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An electric fan comprising:
    a frame having a central tube extending therefrom, the frame defining an air inlet and an air outlet at two different sides thereof;
    a bearing received in the central tube;
    a stator mounted around the central tube, the stator comprising a stator core having a central cylinder, a plurality of radial posts extending from the central cylinder, a stator coil wound around each of the radial posts, and a plurality of magnetic poles formed at free ends of the posts, each magnetic pole comprising a lower portion adjacent to the air outlet and an upper portion adjacent to the air inlet, the upper portions expanding radially along a direction from the air inlet to the air outlet; and
    a rotor being rotatably supported by the bearing, the rotor having a hub surrounding the magnetic poles and having a profile substantially conforming a profile cooperatively formed by the magnetic poles, and a plurality of fan blades extending radially outwardly from the hub.

2. The electric fan as claimed in claim 1, wherein the lower portions are integrally formed with the upper portions.

3. The electric fan as claimed in claim 1, wherein the upper and lower portions of the magnetic poles are formed separately and then assembled together.

4. The electric fan as claimed in claim 3, wherein a tenon extends from one of the upper portion and the lower portion, and the other of the upper portion and the lower portion defines a mortise receiving the corresponding tenon therein.

5. The electric fan as claimed in claim 1, wherein the upper portions of the magnetic poles conform to one of truncated paraboloid profile and truncated cone profile.

6. The electric fan as claimed in claim 5, wherein the lower portions of the magnetic poles cooperatively form a cylinder-shaped profile.

7. The electric fan as claimed in claim 1, wherein the rotor further comprises a permanent magnet adhered to an inner wall of the hub, the hub and the permanent magnet each comprising an upper portion facing the upper portions of the magnetic poles, the upper portions of the hub and permanent magnet expanding radially along the direction from the air inlet to the air outlet.

8. A motor, comprising:
    a stator having a stator core defining a central axis thereof, the stator core comprising a plurality of magnetic poles arranged around the axis and evenly spaced apart from each other, each magnetic pole comprising an upper portion and a lower portion, the upper portion extending aslant towards the central axis from the lower portion, stator coils wound around the stator for generating a magnetic field; and
    a rotor being rotatably supported by the stator, the rotor having a permanent magnet thereon for generating a magnetic filed for interacting with the magnetic field generated by the stator coils.

9. The motor as claimed in claim 8, wherein the upper portions of the magnetic poles cooperatively form one of truncated paraboloid profile and truncated cone profile.

10. The motor as claimed in claim 8, wherein the lower portions of the magnetic poles cooperatively configure a cylinder-shaped profile.

11. The motor as claimed in claim 8, wherein the lower portions are formed integrally with the upper portions.

12. The electric fan as claimed in claim 8, wherein the upper and lowers portions are formed separately, a tenon extends from one of the upper portion and the lower portion, and the other of the upper portion and the lower portion defines a mortise receiving the corresponding tenon therein.

13. A motor for an electric fan comprising:
    a stator comprising:
    a stator core having a central cylinder, a plurality of radial posts extending radially outwardly from the central cylinder, a plurality of magnetic poles extending from free ends of the radial posts, respectively, and a plurality of stator coils wound around the radial posts, respectively, wherein the magnetic poles comprise lower portions cooperatively defining a cylindrical profile and a plurality of upper portions mounted on the lower portions, respectively, and cooperatively defining one of a truncated conic profile and a truncated paraboloid profile; and
    a rotor rotatably mounted on the stator, having a hub and a magnet attached on the hub, the hub and the magnet surrounding the stator and having a profile conforming a profile cooperatively formed by the magnetic poles.

14. The motor as claimed in claim 13, wherein the upper portions of the magnetic poles each have a tenon inserted into a mortise defined in a corresponding lower portion of the magnetic pole.

* * * * *